United States Patent
Murphy

(10) Patent No.: US 10,393,065 B2
(45) Date of Patent: Aug. 27, 2019

(54) VARIABLE NOZZLE APPARATUS

(71) Applicant: UNITED TECHNOLOGIES CORPORATION, Farmington, CT (US)

(72) Inventor: Michael Joseph Murphy, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 161 days.

(21) Appl. No.: 15/808,254

(22) Filed: Nov. 9, 2017

(65) Prior Publication Data

US 2019/0136795 A1    May 9, 2019

(51) Int. Cl.
*F02K 1/09*    (2006.01)
*F02K 3/06*    (2006.01)

(52) U.S. Cl.
CPC .......... *F02K 1/09* (2013.01); *F02K 3/06* (2013.01); *F05D 2220/32* (2013.01); *F05D 2240/128* (2013.01)

(58) Field of Classification Search
None
See application file for complete search history.

(56) References Cited

U.S. PATENT DOCUMENTS

| | | | |
|---|---|---|---|
| 3,032,974 A | | 5/1962 | Meyer |
| 3,279,181 A | * | 10/1966 | Beavers .................... F02K 1/68 60/226.2 |
| 3,403,858 A | | 10/1968 | Kurti et al. |
| 3,600,894 A | * | 8/1971 | McClain ................... F02K 1/72 60/226.1 |
| 5,484,105 A | * | 1/1996 | Ausdenmoore ........ B64D 33/04 239/127.3 |
| 5,947,681 A | * | 9/1999 | Rochford .............. F01D 17/165 415/150 |
| 2007/0062199 A1 | * | 3/2007 | Cowan .................. F02K 1/1223 60/770 |
| 2012/0073263 A1 | * | 3/2012 | Kohlenberg ........... B64D 33/04 60/226.3 |
| 2012/0199670 A1 | * | 8/2012 | Jardine ...................... F02K 1/06 239/265.19 |
| 2013/0067884 A1 | * | 3/2013 | Bhatt ........................ F02K 1/72 60/204 |
| 2013/0092756 A1 | * | 4/2013 | Kennea ..................... F02K 1/09 239/265.33 |
| 2014/0122904 A1 | | 5/2014 | Harris et al. |
| 2015/0107220 A1 | * | 4/2015 | Chakkera ................. F02K 1/72 60/226.2 |

(Continued)

*Primary Examiner* — Michael Lebentritt
(74) *Attorney, Agent, or Firm* — Snell & Wilmer L.L.P.

(57) ABSTRACT

A variable nozzle apparatus may include a radially inward structure and a radially outward structure circumscribing the radially inward structure. An annular flow channel is defined between the radially inward structure and the radially outward structure. One of the radially inward structure and the radially outward structure includes a static portion and a moveable portion. The moveable portion may be to the static portion via helical threads and may thus configured to rotate circumferentially and translate axially relative to the static portion. Movement of the moveable portion relative to the static portion may change a radial dimension of the annular flow channel.

20 Claims, 6 Drawing Sheets

(56) References Cited

U.S. PATENT DOCUMENTS

| | | | |
|---|---|---|---|
| 2016/0010590 A1* | 1/2016 | Rolt | F02K 3/06 |
| | | | 60/805 |
| 2016/0169158 A9 | 6/2016 | Ramlaoui et al. | |
| 2016/0230702 A1* | 8/2016 | Charron | F02K 1/72 |
| 2017/0107943 A1* | 4/2017 | Franer | F01D 25/24 |
| 2017/0138207 A1* | 5/2017 | Niergarth | F01D 7/00 |
| 2017/0321632 A1* | 11/2017 | Howarth | F02K 1/72 |
| 2017/0328306 A1* | 11/2017 | Chmielewski | F01D 25/24 |
| 2018/0017020 A1* | 1/2018 | Howarth | F02K 1/1207 |
| 2019/0055026 A1* | 2/2019 | Sawyers-Abbott | B64D 27/26 |

* cited by examiner

VARIABLE NOZZLE APPARATUS

GOVERNMENT LICENSE RIGHTS

This disclosure was made with government support under Contract No. FA8626-16-C-2139 awarded by the United States Air Force. The government has certain rights in the invention.

FIELD

The present disclosure relates to variable nozzle apparatuses, and more specifically, to a variable exhaust cowl on gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

In addition to the core airflow that flows through the compressor, combustor, and turbine sections of a gas turbine engine, conventional gas turbine engines generally include one or more bypass flow channels for bypass airflow. These bypass airflows may flow through an annular exhaust channel, and the airflow may be modulated using a cowl structure. However, conventional cowl structures are susceptible to becoming misaligned during operation, thereby limiting the effectiveness, efficiency, or overall operability of the cowl modulation configuration.

SUMMARY

In various embodiments, the present disclosure provides a variable nozzle apparatus that includes a radially inward structure and a radially outward structure circumscribing the radially inward structure. In various embodiments, an annular flow channel is defined between the radially inward structure and the radially outward structure. In various embodiments, one of the radially inward structure and the radially outward structure includes a static portion and a moveable portion. The moveable portion may be engaged to the static portion via helical threads and is thus configured to rotate circumferentially and translate axially relative to the static portion. Movement of the moveable portion relative to the static portion changes a radial dimension of the annular flow channel, according to various embodiments.

In various embodiments, the variable nozzle apparatus further includes a means for circumferentially rotating the moveable portion. In various embodiments, the radially outward structure includes the static portion and the moveable portion. In various embodiments, the variable nozzle apparatus further includes an actuator mounted to the static portion of the radially outward structure, wherein the actuator is coupled to the moveable portion and is configured to rotate circumferentially the moveable portion, thereby causing axial translation of the moveable portion via the helical threads. In various embodiments, the actuator includes a piston coupled to the moveable portion of the radially outward structure, wherein the piston is configured to move substantially circumferentially. In various embodiments, the moveable portion includes a first radially inward surface having a first thread pattern and the static portion includes a first radially outward surface having a second thread pattern. The first thread pattern and the second thread pattern may be complementary and may jointly form the helical threads.

In various embodiments, the moveable portion includes a second radially outward surface having a third thread pattern, wherein the actuator comprises a rotatable pinion comprising teeth that are complementarily engaged with the third thread pattern. In various embodiments, the helical threads extend around an entire circumference of the radially outward structure.

Also disclosed herein, according to various embodiments, is a gas turbine engine that includes a turbine section, a main exhaust nozzle configured to direct a main exhaust from the turbine section, and a cowl disposed radially outward of the main exhaust nozzle, wherein an annular flow channel is defined between the cowl and a static structure. The cowl may include a static portion and a moveable portion, wherein the moveable portion is engaged to the static portion via helical threads and is thus configured to rotate circumferentially and translate axially relative to the static portion. Movement of the moveable portion relative to the static portion changes a radial dimension of the annular flow channel. In various embodiments, the gas turbine engine further includes an actuator configured to modulate a position of the cowl.

Also disclosed herein, according to various embodiments, is a method of modulating an annular exhaust flow of a gas turbine engine. The method may include actuating an actuator to drive circumferential rotation and axial translation of a moveable portion of a cowl relative to a static portion of the cowl, wherein the moveable portion and the static portion are engaged together via helical threads. The method may also include adjusting a radial dimension of an annular flow channel defined between the cowl and a static structure. In various embodiments, translation of the cowl in an aft direction increases the radial dimension of the annular flow channel. In various embodiments, translation of the cowl in a forward direction decreases the radial dimension of the annular flow channel. In various embodiments, the helical threads extend around an entire circumference of cowl.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
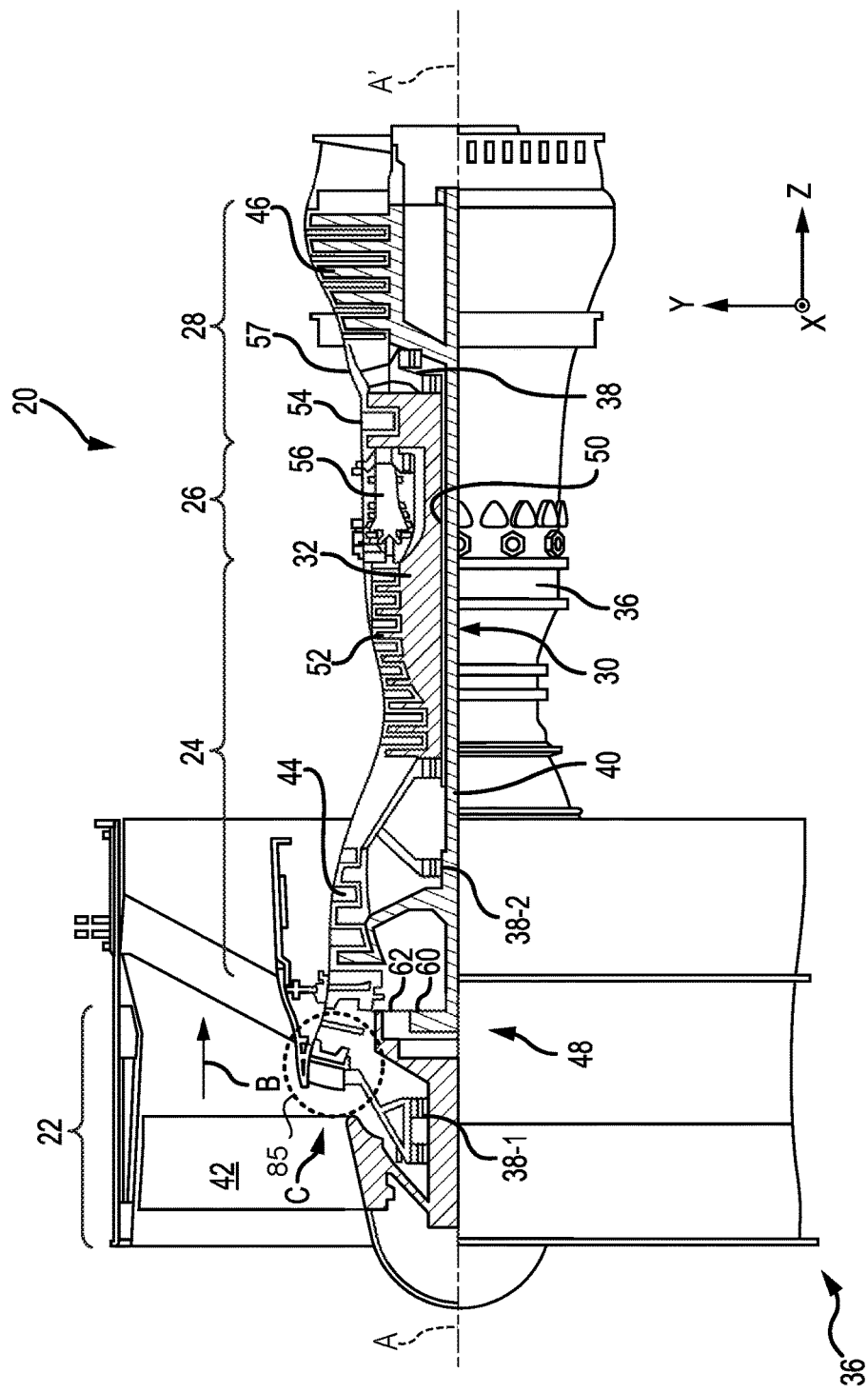
FIG. 1 illustrates a cross-sectional view of a gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

The present disclosure provides, according to various embodiments, a variable nozzle apparatus. As described in greater detail below, the variable nozzle apparatus generally includes a moveable portion threadably engaged on a static portion. The moveable portion is generally configured to rotate circumferentially and translate axially, relative to the static portion via helical threads, to modulate an annular airflow. While numerous details and examples are included below pertaining to the variable nozzle apparatus being implemented to modulate an airflow of exhaust in a gas turbine engine, the variable nozzle apparatus may be utilized and implemented in other applications.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a path of bypass airflow B while compressor section 24 can drive air along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2A:
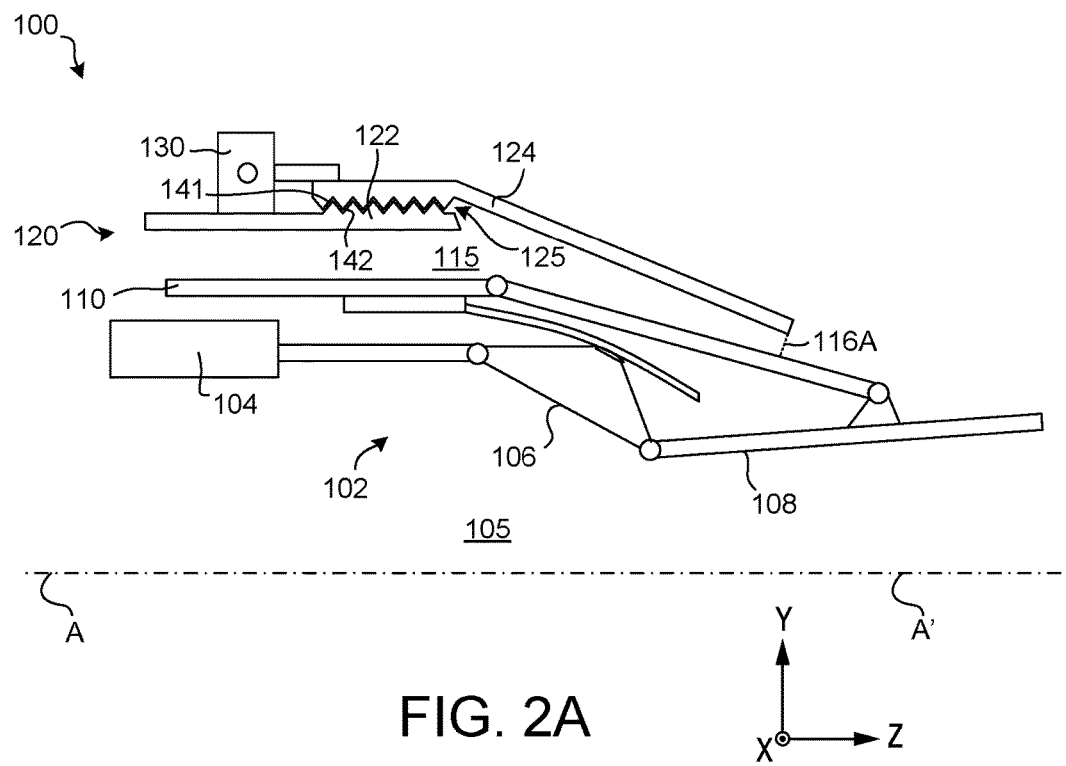
FIG. 2A illustrates a schematic cross-sectional view of a variable nozzle apparatus in a first position, in accordance with various embodiments.
Figure 2B:
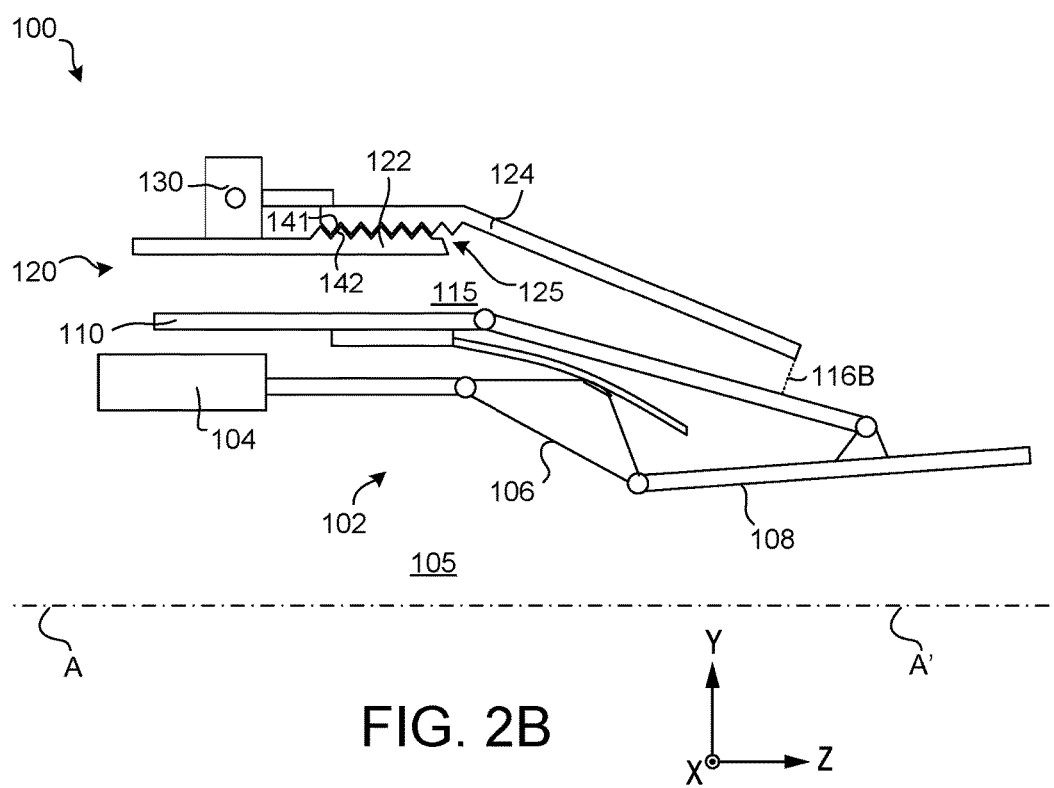
FIG. 2B illustrates a schematic cross-sectional view of a variable nozzle apparatus in a second position, in accordance with various embodiments.

In various embodiments and with reference to FIGS. 2A and 2B, a variable nozzle apparatus 100 is provided. The variable nozzle apparatus 100 includes a radially inward structure 110 and a radially outward structure 120, according to various embodiments. The radially outward structure 120 may circumscribe the radially inward structure 110, and an annular flow channel 115 may be defined and/or disposed between the radially inward structure 110 and the radially outward structure 120. In various embodiments, either the radially inward structure or the radially outward structure may include a static portion and a moveable portion. In various embodiments, and with continued reference to FIGS. 2A and 2B, the radially outward structure 120 may be the one that includes the static portion 122 and the moveable portion 124. Generally, as mentioned above, the moveable portion 124 is engaged to the static portion 122 via helical threads 125 and is thus configured to rotate circumferentially and translate axially relative to the static portion 122. Movement of the moveable portion 124 changes a radial dimension 116A, 116B of the annular flow channel 115, according to various embodiments. The threaded engagement of the moveable portion 124 to the static portion 122 may prevent the moveable portion 124 from becoming misaligned with the static portion 122, thereby improving operating efficiency of the variable nozzle apparatus 100 and/or improving the operational life of the apparatus 100.

The radially inward structure 110 may be a static structure of a gas turbine engine 20, such as a case. The radially outward structure 120 may be a cowl disposed radially outward of the static structure. In various embodiments, the static structure (i.e., the radially inward structure 110) may either be a component of or may be disposed radially outward of a main exhaust nozzle 102 that is configured to direct a main/core exhaust from the turbine section 28 (FIG. 1). Said differently, exhaust from the engine core and fan of the gas turbine engine may be exhaust via main exhaust channel 105 and may be modulated by main exhaust nozzle 102. The main exhaust nozzle 102 may include an actuator 104 that is configured to control movement of a convergent flap 106 and a divergent flap 108 to modulate and direct main exhaust flow. For example, main exhaust channel 105 may extend generally down the center line A-A of the gas turbine engine in the aft direction and is directed and/or channeled by the main exhaust nozzle 102. One or more airflow streams may flow generally along this core axis. For example, a first and a second stream, which may have been separate streams forward of the main exhaust channel 105, may flow generally through main exhaust channel 105A. Gas may also flow through the annular flow channel 115 that is defined outboard (i.e., radially outward of) of the main exhaust nozzle 102 and/or the static structure (e.g., radially inward structure 110).

In various embodiments, the airflow through the annular flow channel 115 may be modulated to improve the overall efficiency of the gas turbine engine. For example, the airflow through the annular flow channel 115 may be activated in response to the gas turbine engine operating in a cruise condition and/or where the fuel efficiency of the gas turbine engine can be increased, improved or optimized. The airflow through the annular flow channel 115 may be activated and/or modulated by changing the relative distance between the static structure (i.e. radially inward structure 110) (and/or static structure 110) and the cowl (i.e., the radially outward structure 120). The radially outward structure 120 (e.g., cowl) may be a portion of the nacelle of the gas turbine engine 20.

Figure 3:
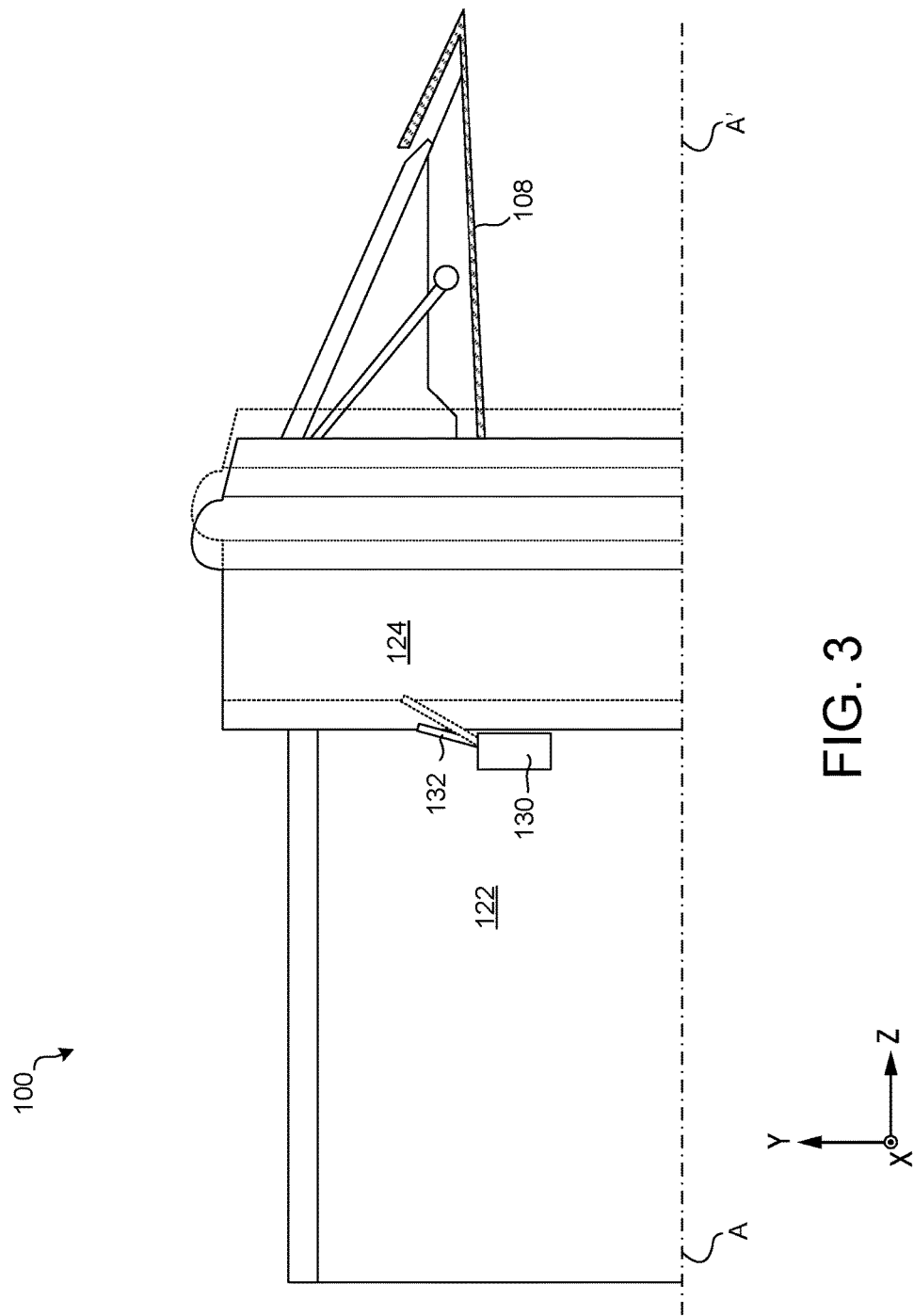
FIG. 3 illustrates a schematic view of a cowl of a gas turbine engine, in accordance with various embodiments.

In various embodiments and with reference to FIGS. 2A, 2B, and 3, the moveable portion of the cowl (i.e., the moveable portion 124 of the radially outward structure 120) may be moveable between a first position, as shown in FIGS. 2A and 3 (solid lines), and a second position, as shown in FIGS. 2B and 3 (dashed line). That is, the moveable portion 124 of the radially outward structure 120 may be rotated along the helical threads to cause an axial translation of the moveable portion 124 of the radially outward structure 120. This movement is relative to both the static portion 122 of the radially outward structure 120 and relative to the radially inward structure 110 (e.g., static structure and/or main exhaust nozzle 102) of the variable nozzle apparatus 100.

In various embodiments, and with continued reference to FIGS. 2A, 2B, and 3, the variable nozzle apparatus 100 may also include a means for circumferentially rotating the moveable portion 124 relative to the static portion 122, such as an actuator 130. The actuator 130 may be mounted to the static portion 122 of the radially outward structure 120. The actuator 130 may also include a shaft or arm that is coupled to the moveable portion 124 of the radially inward structure 120. By actuating the actuator 130, the moveable portion 124 may rotate circumferentially and translate axially along the helical threads 125, thereby changing a radial dimension 116A, 116B of the annular flow channel 115. For example, in various embodiments the actuator 130 is a linear actuator that includes a piston that moves in a generally axial direction to control the position of the moveable portion 124. In various embodiments, the actuator 130 includes a piston 132 that is generally configured to move in a circumferential direction (i.e., substantially circumferentially). As shown in FIG. 3, the actuator 130 may include a connecting arm 132 that is pivotally mounted to head of the piston, such that actuation of the connecting arm 132 in a circumferential direction (e.g., in a positive direction along the y axis) causes, via helical threads 125, a corresponding circumferential rotation of the moveable portion 124 and a corresponding axial translation of the moveable portion 124 (e.g., in a positive direction along the z axis).

In various embodiments, the helical threads 125 refer to tracks of complementary screw threads. The threads depicted herein are shown schematically and are thus not necessarily indicative of the shape and/or geometry of the actual threads. The complementary screw threads may include buttress threads, rounded threads, square threads, etc. In various embodiments, for example, the moveable portion 124 includes a first radially inward surface comprising a first thread pattern 141 and the static portion 122 includes a first radially outward surface comprising a second thread pattern 142. The first and second thread patterns 141, 142 may jointly form the helical threads 125. In various embodiments, the helical threads 125 extends around an entire circumference of the radially outward structure 120

Figure 4A:
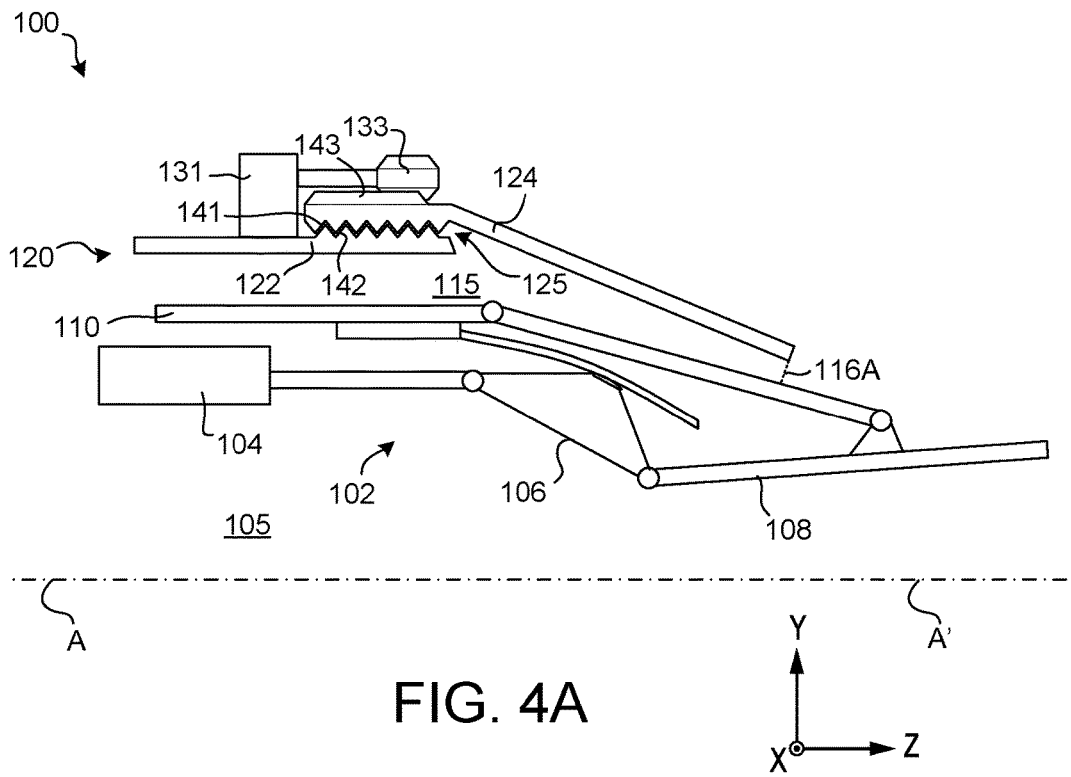
FIG. 4A illustrates a schematic cross-sectional view of a variable nozzle apparatus in a first position, in accordance with various embodiments.
Figure 4B:
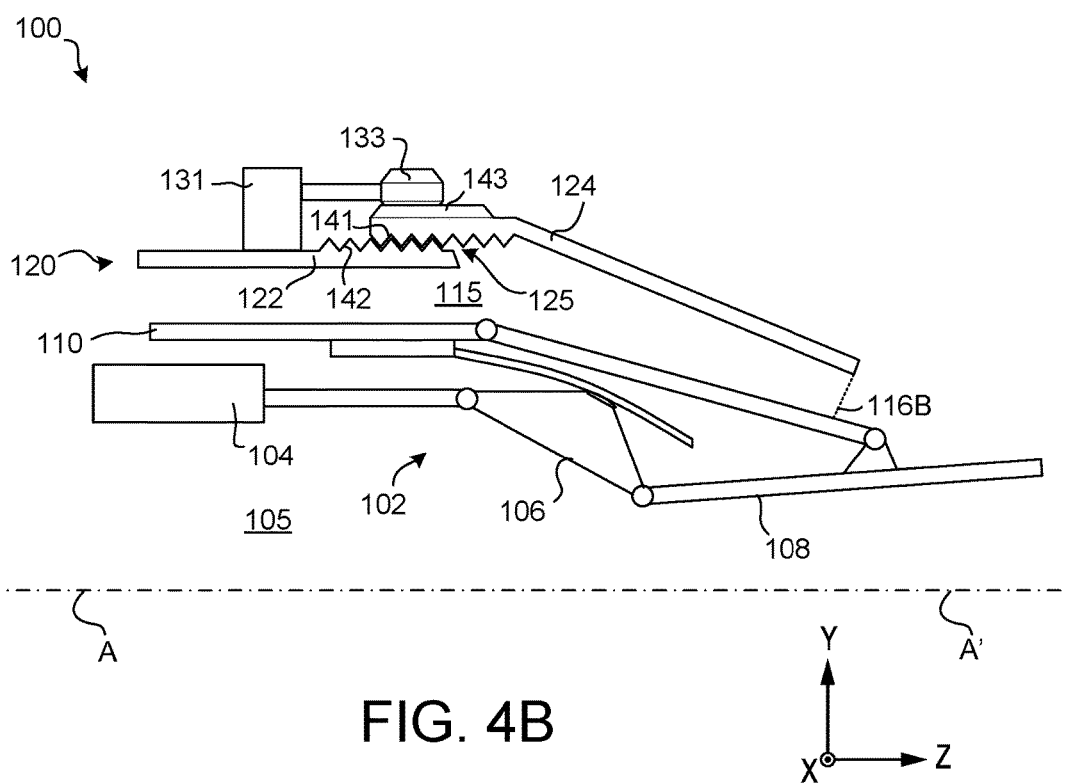
FIG. 4B illustrates a schematic cross-sectional view of a variable nozzle apparatus in a second position, in accordance with various embodiments.
Figure 5A:
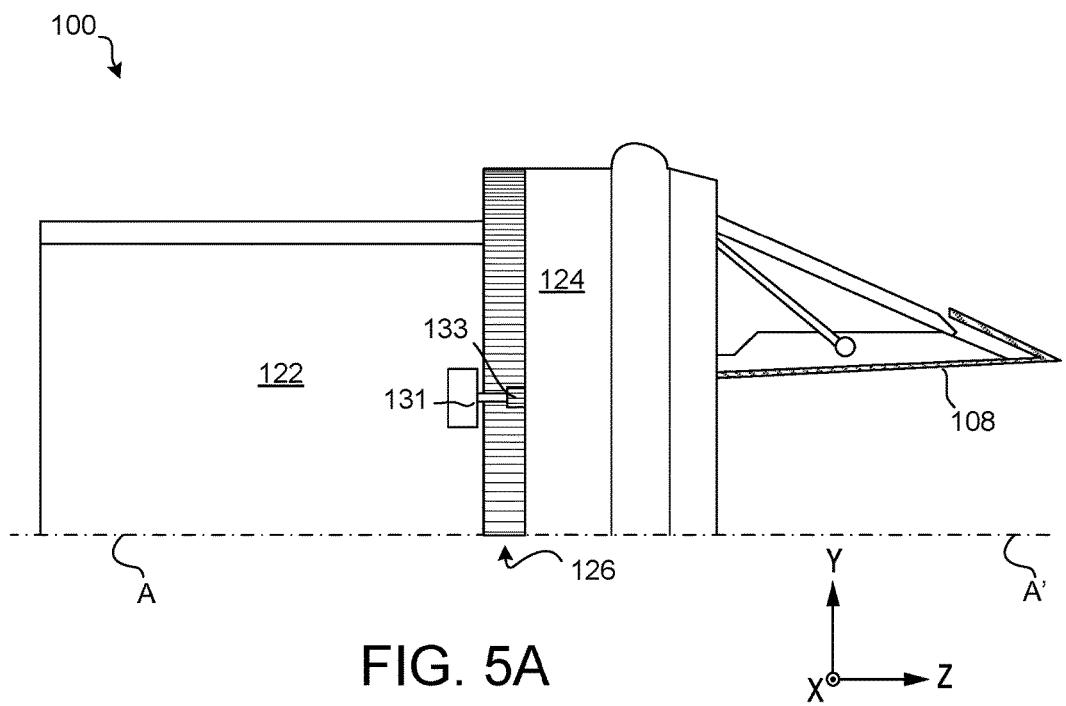
FIG. 5A illustrates a schematic view of a cowl of a gas turbine engine in a first position, in accordance with various embodiments.
Figure 5B:
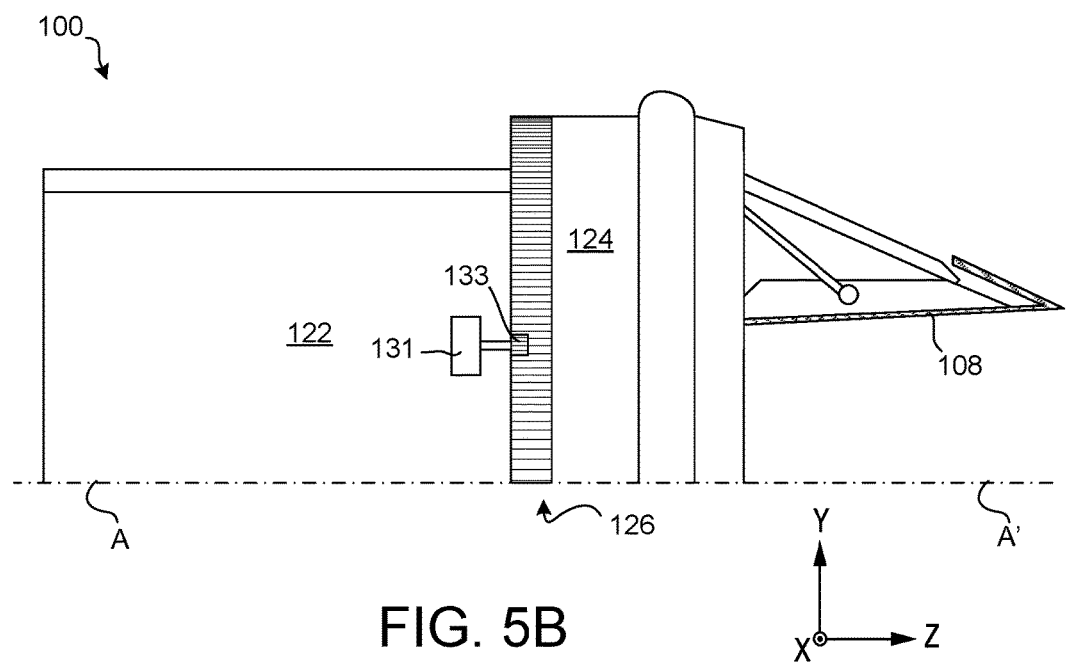
FIG. 5B illustrates a schematic view of a cowl of a gas turbine engine in a second position, in accordance with various embodiments.

In various embodiments, and with reference to FIGS. 4A, 4B, and 5, the actuator 131 may be a rotary actuator that includes a rotatable pinion/gear 133. In various embodiments, the moveable portion 124 includes a second radially outward surface that includes a third thread pattern 143. The third thread pattern 143 may engage the teeth of the pinion/gear 133. Said differently, the teeth of the pinion/gear 133 are complementarily engaged with the third thread pattern 143, according to various embodiments. In various embodiments, the third thread pattern 143 extends around an entire circumference of the radially outward structure 120. In various embodiments, the variable nozzle apparatus 100 includes a plurality of actuators 130. The plurality of actuators may be circumferentially distributed around the radially outward structure 120 (e.g., the cowl) to provide a uniform actuation force to promote even movement of the moveable portion 124.

Figure 6:
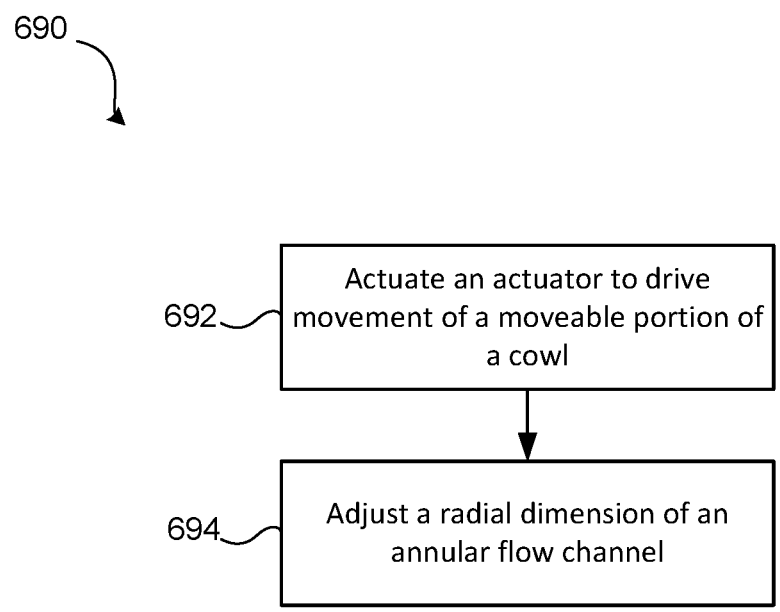
FIG. 6 is a schematic flow chart diagram of a method of modulating an annular exhaust flow of a gas turbine engine, in accordance with various embodiments.

In various embodiments, and with reference to FIG. 6, a method 690 of modulating an annular exhaust flow of a gas turbine engine 20 is provided. The method 690 may include actuating an actuator, such as actuator 130, to drive movement of the moveable portion 124 of cowl (e.g., radially outward structure 120) at step 692. Step 692 may include utilizing the actuator 130 to drive circumferential rotation and axial translation of the moveable portion 124 of the cowl (e.g., radially outward structure 120) via helical threads. The method 690 may further include adjusting radial dimension 116A, 116B of the annular flow channel 115 at step 694. In various embodiments, translation of the cowl in an aft direction increases the radial dimension 116B of the annular flow channel 115. In various embodiments, translation of the cowl in a forward direction decrease the radial dimension 116A of the annular flow channel 115.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A variable nozzle apparatus comprising:
   a radially inward structure; and
   a radially outward structure circumscribing the radially inward structure, wherein an annular flow channel is defined between the radially inward structure and the radially outward structure;

wherein one of the radially inward structure and the radially outward structure comprises a static portion and a moveable portion, wherein the moveable portion is engaged to the static portion via helical threads and is thus configured to rotate circumferentially and translate axially relative to the static portion, wherein movement of the moveable portion relative to the static portion changes a radial dimension of the annular flow channel.

2. The variable nozzle apparatus of claim 1, further comprising a means for circumferentially rotating the moveable portion.

3. The variable nozzle apparatus of claim 1, wherein the radially outward structure comprises the static portion and the moveable portion, wherein the variable nozzle apparatus further comprises an actuator mounted to the static portion of the radially outward structure, wherein the actuator is coupled to the moveable portion and is configured to rotate circumferentially the moveable portion, thereby causing axial translation of the moveable portion via the helical threads.

4. The variable nozzle apparatus of claim 3, wherein the actuator comprises a piston coupled to the moveable portion of the radially outward structure, wherein the piston is configured to move substantially circumferentially.

5. The variable nozzle apparatus of claim 3, wherein the moveable portion comprises a first radially inward surface comprising a first thread pattern and the static portion comprises a first radially outward surface comprising a second thread pattern, wherein the first thread pattern and the second thread pattern are complementary and jointly form the helical threads.

6. The variable nozzle apparatus of claim 5, wherein the moveable portion comprises a second radially outward surface comprising a third thread pattern, wherein the actuator comprises a rotatable pinion comprising teeth that are complementarily engaged with the third thread pattern.

7. The variable nozzle apparatus of claim 5, wherein the helical threads extend around an entire circumference of the radially outward structure.

8. A gas turbine engine comprising:
a turbine section;
a main exhaust nozzle configured to direct a main exhaust from the turbine section;
a cowl disposed radially outward of the main exhaust nozzle, wherein an annular flow channel is defined between the cowl and a static structure, wherein the cowl comprises a static portion and a moveable portion, wherein the moveable portion is engaged to the static portion via helical threads and is thus configured to rotate circumferentially and translate axially relative to the static portion, wherein movement of the moveable portion relative to the static portion changes a radial dimension of the annular flow channel.

9. The gas turbine engine of claim 8, further comprising an actuator configured to modulate a position of the cowl.

10. The gas turbine engine of claim 9, wherein the actuator is mounted to the static portion of the cowl and coupled to the moveable portion of the cowl, wherein the actuator is configured to rotate circumferentially the moveable portion, thereby causing axial translation of the moveable portion via the helical threads.

11. The gas turbine engine of claim 10, wherein the actuator comprises a piston coupled to the moveable portion of the cowl, wherein the piston is configured to move substantially circumferentially.

12. The gas turbine engine of claim 10, wherein the moveable portion comprises a first radially inward surface comprising a first thread pattern and the static portion comprises a first radially outward surface comprising a second thread pattern, wherein the first thread pattern and the second thread pattern are complementary and jointly form the helical threads.

13. The gas turbine engine of claim 12, wherein the moveable portion comprises a second radially outward surface comprising a third thread pattern, wherein the actuator comprises a rotatable pinion comprising teeth that are complementarily engaged with the third thread pattern.

14. The gas turbine engine of claim 13, wherein the third thread pattern extend around an entire circumference of the cowl.

15. The gas turbine engine of claim 8, wherein the helical threads extend around an entire circumference of cowl.

16. The gas turbine engine of claim 15, wherein the actuator is one of a plurality of actuators that are circumferentially distributed around the cowl.

17. A method of modulating an annular exhaust flow of a gas turbine engine, the method comprising:
actuating an actuator to drive circumferential rotation and axial translation of a moveable portion of a cowl relative to a static portion of the cowl, wherein the moveable portion and the static portion are engaged together via helical threads; and
adjusting a radial dimension of an annular flow channel defined between the cowl and a static structure.

18. The method of claim 17, wherein translation of the cowl in an aft direction increases the radial dimension of the annular flow channel.

19. The method of claim 17, wherein translation of the cowl in a forward direction decreases the radial dimension of the annular flow channel.

20. The method of claim 17, wherein the helical threads extend around an entire circumference of cowl.

* * * * *